Dec. 14, 1926.   L. S. WHITEHEAD   1,611,093
RUBBER HEEL AND METHOD OF MANUFACTURING THE SAME
Filed April 28, 1924
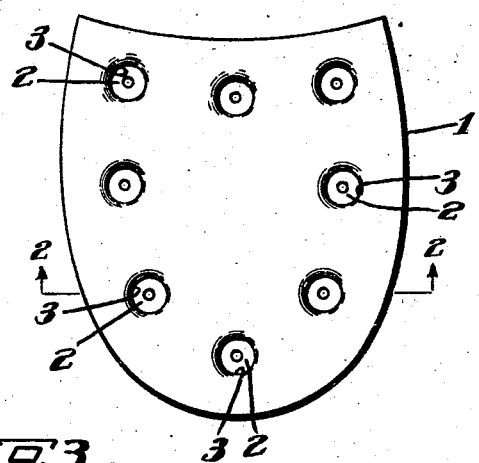
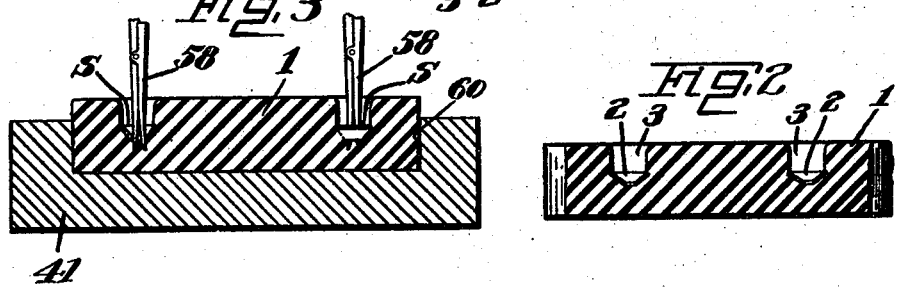
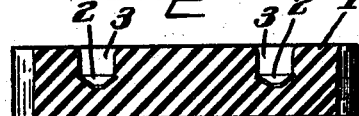
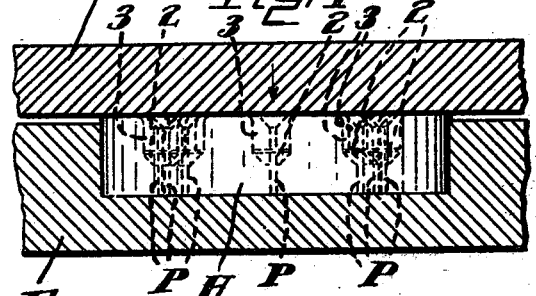
Inventor
Leo S. Whitehead
By Attorney Patented Dec. 14, 1926.

1,611,093

UNITED STATES PATENT OFFICE.

LEO S. WHITEHEAD, OF AKRON, OHIO.

RUBBER HEEL AND METHOD OF MANUFACTURING THE SAME.

Application filed April 28, 1924. Serial No. 709,512.

This invention relates to rubber heels and to the method of manufacturing them, and more particularly to the placement in the heel of the usual washers which are molded in selected positions in the rubber and receive the nails or other fastenings by means of which the heel is secured to the shoe, such washers serving as reinforcements to the rubber under the nail heads to prevent the rubber heel from being pulled over the nails.

My present application is a continuation in part of my prior application, Ser. No. 567,978, filed June 13, 1922, in which I showed a machine for automatically inserting washers in heel blanks by this method.

In the usual process of manufacturing rubber heels, the rubber heel blanks or biscuits, of uncured or semicured rubber compound, are placed in a multi-cavity metal mold and subjected to suitable heat and pressure to cause the compound to completely fill the mold. The nail receiving washers for each heel are customarily positioned upon shouldered pilot pins projecting from one of the mold members of the sectional mold, and the biscuit or unvucanized heel is placed on these pins and is pressed into the heel cavities of the cooperating mold member, so that when the members are closed, the washers are forced into and embedded within the body of the heel blank in the proper relationship which they are to bear to each other in the finished heel.

Heretofore the practice has been for the pressman or molder to place the washers one at a time, by hand, on the pilot pins of the molds. The washers are small and it is difficult for the pressmen, who necessarily need to be strong, active men in order to handle the heavy multi-cavity molds commonly used, to accustom their fingers to the transposition from the bulky molds to the tiny washers. Moreover, the molds as they come from the curing ovens are hot so that in placing the small washers upon the pilot pins, the pressman's fingers are apt to be burnt and become calloused. Not infrequently, the pressman fails to place a washer on a mold pin and it drops into the mold and is improperly embedded in the heel when the heel is vulcanized, if the pressman does not take the trouble to retrieve it before the molds are closed, as often happens. Consequently the operation of placing the washers on the mold pins is a slow and tedious one and not only involves a considerable loss of time, but also a material loss of heat in filling the molds for successive curing operations.

To the end, therefore, of avoiding the objections to present practice, I have devised my invention. According to it, the washers are located in the uncured or partially cured heel blank in the proper positional relationship which it is desired to have them bear to each other in the finished heel prior to molding the heel. This avoids the necessity for placing the washers one by one, by hand, on the pins of the hot molds with consequent saving in time and heat, and enables me to utilize cheaper labor in handling the washers by relieving the pressman, who is a high-paid operative, of this task. Moreover, this permits the heel blanks to be loaded in some room remote from the hot press room, or indeed at some factory, the loaded blanks being transported as required to the press room.

My invention therefore involves not only a novel method of loading or washing the uncured heel blanks, but also provides a novel article of manufacture consisting of a substantially unvulcanized rubber heel blank in which the fastener receiving members or washers are located therein in substantially the positional relationship which it is desired to have them bear to each other in the finished heel prior to performing the usual molding and vulcanizing operations on the blank.

The method of practicing my invention, together with an article produced in accordance therewith and conventional apparatus for carrying out the principles involved, is described and illustrated in the accompanying specification and drawings, and the characteristic features of novelty are particularly pointed out in the appended claims. Throughout the specification and drawings like reference characters are employed to indicate corresponding parts, and in the drawings:

Fig. 1 is an elevation of a substantially unvulcanized rubber heel blank or biscuit prior to the molding and vulcanizing operations and showing a series of nail receiving washers properly located therein.

Fig. 2 is a section on the line 2—2 of Fig. 1.

Fig. 3 is a sectional view of conventional apparatus for inserting the washers in the unvulcanized heel blank.

Fig. 4 is a fragmentary section through a vulcanizing mold of conventional type and showing the loaded heel blank positioned therein, and Fig. 5 is a cross-section through the finished heel.

I have indicated at 1 an uncured or semicured rubber heel blank or biscuit which is formed in the customary manner by running the rubber composition into sheets of suitable thickness and dieing out the heel blanks from this stock. According to my invention the nail receiving members, here shown as washers 2, are positioned in the blank 1 in substantially the spaced relationship which it is desired to have these washers occupy in the finished heel before the blank is molded and vulcanized.

This may be accomplished either by anchoring the washers on the surface of the heel blank or by definitely lodging said washers in receiving apertures 3 of suitable depth formed in the blank. Where lodged in apertures, such apertures may be either formed in the heel blank preliminarily to inserting the washers, or the apertures may be formed therein simultaneously with the insertion of the washers and by the washer insertion devices themselves.

With any of the foregoing suggested methods, however, it is possible to accurately load the heel blank with washers preparatory to the molding and vulcanizing operations and independently of the molds themselves.

For the purposes of this application and purely as illustrative of one of the variety of possible methods of achieving the results set forth hereinbefore, I have shown the heel blank as having been provided with the required number of properly spaced washer-retaining apertures preliminary to the washer-inserting operation. These apertures may be formed by any suitable apparatus. The uncured heel blank with the washer-receiving apertures formed therein, is supported either singly or in groups on a relatively fixed support 41 (Fig. 3) which is provided with suitable cavities 60 for receiving the individual heel blanks. The washers 2 are inserted into the apertures 3 of the heel blanks by a plurality of reciprocating washer pick-up devices 58 which operate to transfer the washers from any suitable washer supporting plate, upon which they have been previously placed, to the heel blanks. The pick-up devices 58 are so spaced relative to each other as to position the washers in the blank in substantially the relationship which they must bear to each other in the finished heel.

The pick-up devices 58 enter the blanks and deposit their washers in the cavities formed therein to receive them. On the return movement of the pick-up devices 58 the washers are stripped therefrom and left in said cavities, being retained therein by the frictional engagement of the washer rims with the walls of the cavities which are slightly smaller in diameter than said rim S.

The loaded blanks may now be removed from the blank support 41 and transferred to the press room and subjected to the usual molding and vulcanizing operations. In such operations, the loaded blanks are placed between the open male and female sections, M and F, respectively, of a multi-cavity vulcanizing mold of standard type (Fig. 4) with the openings of the washers 2 in line with the pilot pins P of the male section of the mold so that when the mold is closed and placed in the vulcanizing oven and the blanks subjected to heat and pressure, said pins will pass through said washers and form in the finished heels H (Fig. 5, the nail receiving openings 4. Obviously, my invention is capable of considerable modification in practice, according to the particular conditions of manufacturing procedure prevalent in different factories, and hence such modifications in method or article as fall within the spirit and scope of my invention are to be regarded as within the limits of the appended claims.

What I therefore claim and desire to secure by Letters Patent is:

1. An article of manufacture consisting of a rubber heel blank carrying a series of fastening receiving washers arranged in substantially the positional relationship which it is desired to have said washers bear to each other in the finished heel.

2. An article of manufacture consisting of a substantially unvulcanized rubber heel blank having a series of fastening receiving washers contained within the body thereof in substantially the positional relationship which it is desired to have said washers bear to each other in the finished heel.

3. That improvement in the process of manufacturing rubber heels having nail receiving washers embedded therein, which consists in securing the washers in a rubber heel blank in substantially the positional relationship which it is desired to have them bear to each other in the finished heel, subsequently placing said blank in a heel mold, and then performing the molding and vulcanizing operations on the blank while holding said washers in said relationship.

4. That step in the process of manufacturing rubber heels having nail receiving washers embedded therein, which consists in securing the washers in the surface of an unvulcanized rubber heel blank prior to the molding of the heel and in substantially the positional relationship which it is desired to have said washers bear to each other in the finished heel.

5. The method of manufacturing rubber heels which consists in forming apertures in the heel blanks, placing washers in said apertures, said washers being of larger diameter than said apertures whereby they are retained therein, and curing said heel blank with said washers so retained.

6. The method of assembling nail washers in rubber heel blanks which consists in forming apertures in the heel blank slightly smaller in diameter than the washers, supporting the washers upon supports in registering relation to said apertures, and pressing said heel blank and washer supports together to cause said washers to enter said apertures, the rims of said washers being frictionally engaged by the walls of said apertures and retained therein.

7. The method of manufacturing rubber heels which consists of forming washer-receiving apertures in the heel blank, supporting washers upon supports to register with said apertures, pressing said heel blank and said support together to cause said washers to enter said apertures, the walls of said apertures being adapted to engage and retain said washers, separating said heel blank and said washer supports, placing said heel blank with its retained washers in a mold with said washers resting upon shouldered pins in said mold, and subjecting said mold to heat and pressure to cause the material of the blank to completely fill the mold and surround said pins and said washers.

8. That improvement in the process of manufacturing a rubber heel having nail receiving washers embedded therein, which consists in locating the washers within the body of an unvulcanized rubber heel blank in substantially the positional relationship which it is desired to have them bear to each other in the finished heel, subsequently placing said blank in a heel mold, and then performing the molding and vulcanizing operations on the blank while holding said washers in said relationship.

9. That improvement in the art of manufacturing a rubber heel having nail receiving washers embedded therein, which consists in anchoring the washers to the body of an unvulcanized rubber heel blank in substantially the positional relationship which it is desired to have them bear to each other in the finished heel, subsequently placing said blank in a heel mold, and then performing the molding and vulcanizing operations on the blank while holding said washers in said relationship.

10. The method of manufacturing rubber heels which consists of forming washer-receiving apertures in the heel-blank, supporting washers upon supports to register with said apertures, pressing said heel-blank and said supports together to cause said washers to enter said apertures, the walls of said apertures being adapted to engage and retain said washers, and separating said heel-blank and said supports to cause said washers to be withdrawn from said supports with said heel blank.

11. The method of causing a washer to be retained in an aperture in soft, resilient rubber prior to placing the rubber in a curing mold, which consists of forming the washer slightly larger in diameter than said aperture, and pressing the washer into said aperture with the rim of the washer expanding the wall of the aperture where it is yieldingly held by the elasticity of the rubber.

In testimony whereof I affix my signature.

LEO S. WHITEHEAD.